United States Patent
Choi et al.

(10) Patent No.: US 7,385,914 B2
(45) Date of Patent: Jun. 10, 2008

(54) APPARATUS AND METHOD OF MULTIPLE ANTENNA TRANSMITTER BEAMFORMING OF HIGH DATA RATE WIDEBAND PACKETIZED WIRELESS COMMUNICATION SIGNALS

(75) Inventors: Won-Joon Choi, Sunnyvale, CA (US); Ardavan M. Tehrani, Menlo Park, CA (US); Jeffrey M. Gilbert, Sunnyvale, CA (US); Samuel Ng, Fremont, CA (US)

(73) Assignee: Atheros Communications, Inc., Santa Clara, CA (US)

( * ) Notice: Subject to any disclaimer, the term of this patent is extended or adjusted under 35 U.S.C. 154(b) by 897 days.

(21) Appl. No.: 10/682,381

(22) Filed: Oct. 8, 2003

(65) Prior Publication Data

US 2005/0078763 A1    Apr. 14, 2005

(51) Int. Cl.
*H04J 11/00*  (2006.01)
(52) U.S. Cl. .................. 370/203; 370/334; 375/267; 375/299
(58) Field of Classification Search ............. 370/203, 370/328, 334; 375/267, 299
See application file for complete search history.

(56) References Cited

U.S. PATENT DOCUMENTS

| | | | |
|---|---|---|---|
| 5,936,569 A | 8/1999 | Ståhle et al. | |
| 6,128,276 A | 10/2000 | Agee | 370/208 |
| 6,393,032 B1* | 5/2002 | Ikegami | 370/447 |
| 6,449,303 B2* | 9/2002 | Hunton | 375/130 |
| 6,522,898 B1 | 2/2003 | Kohno et al. | |
| 6,563,858 B1 | 5/2003 | Fakatselis et al. | |
| 6,584,302 B1* | 6/2003 | Hottinen et al. | 455/69 |
| 6,600,446 B2* | 7/2003 | Moch | 342/373 |
| 6,665,545 B1* | 12/2003 | Raleigh et al. | 455/562.1 |
| 6,687,492 B1* | 2/2004 | Sugar et al. | 455/276.1 |
| 6,748,024 B2* | 6/2004 | Kuchi et al. | 375/299 |

(Continued)

FOREIGN PATENT DOCUMENTS

EP          9 622 911 A2       11/1994

(Continued)

OTHER PUBLICATIONS

Negi et al, "Transmission over Fading Channels with Channel Side Information and Delay Constraint", 1999, IEEE Globecom 1999, vol. 5, p. 2550-2554.*

(Continued)

*Primary Examiner*—Hassan Kizou
*Assistant Examiner*—Brian T O'Connor
(74) *Attorney, Agent, or Firm*—Bever, Hoffman & Harms, LLP; Jeanette S. Harms

(57) ABSTRACT

The present invention provides an apparatus and method of multiple antenna transmitter beamforming of high data rate wideband packetized wireless communication signals, where each of the signals comprises N frequencies, where N is a positive integer. The apparatus, in an exemplary embodiment, includes (1) a transmit beamformer that co-phases and weights the signals for each of the N frequencies across M antennas, thereby generating M co-phased and weighted frequency data and (2) M Inverse Fast Fourier Transform units (IFFTs) that convert the M co-phased and weighted frequency data into M digital outputs, and M transmit antennas transmitting the M co-phased and weighted signals, where M is an integer greater than or equal to 2.

67 Claims, 6 Drawing Sheets

U.S. PATENT DOCUMENTS

| | | | |
|---|---|---|---|
| 6,754,286 B2 * | 6/2004 | Hottinen et al. | 375/299 |
| 6,763,009 B1 * | 7/2004 | Bedekar et al. | 370/335 |
| 6,785,520 B2 * | 8/2004 | Sugar et al. | 455/101 |
| 6,816,557 B2 * | 11/2004 | Kuchi et al. | 375/299 |
| 6,862,271 B2 * | 3/2005 | Medvedev et al. | 370/329 |
| 6,862,456 B2 * | 3/2005 | Sugar et al. | 455/503 |
| 6,873,651 B2 * | 3/2005 | Tesfai et al. | 375/219 |
| 6,917,820 B2 * | 7/2005 | Gore et al. | 455/562.1 |
| 6,940,917 B2 * | 9/2005 | Menon et al. | 375/267 |
| 7,139,324 B1 * | 11/2006 | Ylitalo et al. | 375/267 |
| 7,184,992 B1 * | 2/2007 | Polyak et al. | 706/46 |
| 7,194,039 B2 * | 3/2007 | Hunton | 375/260 |
| 7,242,727 B2 * | 7/2007 | Liu et al. | 375/295 |
| 7,286,609 B2 * | 10/2007 | Maltsev et al. | 375/267 |
| 2002/0172269 A1 | 11/2002 | Xu | |
| 2003/0072397 A1 | 4/2003 | Kim et al. | |
| 2003/0161282 A1 | 8/2003 | Medvedev et al. | |
| 2003/0165187 A1 | 9/2003 | Tesfai et al. | |
| 2004/0037218 A1 * | 2/2004 | Ma | 370/208 |
| 2004/0072546 A1 | 4/2004 | Sugar et al. | |
| 2004/0087275 A1 | 5/2004 | Sugar et al. | |
| 2004/0136466 A1 | 7/2004 | Tesfai et al. | |
| 2004/0209579 A1 | 10/2004 | Vaidyanathan | |

FOREIGN PATENT DOCUMENTS

| | | | |
|---|---|---|---|
| EP | 1 085 678 A | 3/2001 |
| EP | 1 185 048 A | 3/2002 |
| EP | 1 220 505 A | 7/2002 |
| EP | 1 231 722 | 8/2002 |
| EP | 1 335 503 A | 8/2003 |
| WO | WO 96/04717 A | 2/1996 |
| WO | WO 99/56407 A | 11/1999 |
| WO | WO 00/77961 A | 12/2000 |
| WO | WO 02/43184 A | 5/2002 |
| WO | WO 02/054850 A | 7/2002 |
| WO | WO 03/023995 | 3/2003 |
| WO | WO 03/041299 A | 5/2003 |
| WO | WO 03/075396 | 9/2003 |

OTHER PUBLICATIONS

Negi et al, "Adaptive Antennas for Space-Time Coding over Block-Time Invariant Multipath Fading Channels", May 1999, IEEE Vehicular Technology Conference, vol. 1, p. 70-74.*

Schmidl, Timothy M., et al., "Robust Frequency an Timing Synchronization for OFDM", IEEE, vol. 45 (No. 12), pp. 1613-1621, (Dec. 1997).

* cited by examiner

APPARATUS AND METHOD OF MULTIPLE ANTENNA TRANSMITTER BEAMFORMING OF HIGH DATA RATE WIDEBAND PACKETIZED WIRELESS COMMUNICATION SIGNALS

CROSS-REFERENCE TO RELATED APPLICATIONS

The present application is related to co-pending and commonly owned U.S. Patent Application filed Oct. 8, 2003 entitled "Apparatus And Method Of Multiple Antenna Receiver Combining Of High Data Rate Wideband Packetized Wireless Communication Signals" (Serial Number to be assigned, bearing Ser. No. 10/682,787. The aforementioned application is hereby incorporated by reference.

FIELD OF THE INVENTION

The present invention relates to wireless communications. More particularly, the invention relates to an apparatus and method of multiple antenna transmitter beamforming of high data rate wideband packetized wireless communication signals.

BACKGROUND OF THE INVENTION

Wireless communication systems use antennas to communicate signals. A wireless local area network (WLAN) is a type of wireless communication system that communicates information between nodes in a given area.

Wireless communication systems use transmitters to transmit signals.

Types of Signals

Narrowband and Wideband Signals

Most current wireless communication systems are narrowband signal systems. Narrowband signals have signal bandwidths ranging from tens of kilohertz (kHz) (e.g. 50 kHz) to hundreds of kilohertz (500 Khz). In contrast, wideband, or broadband, signals have signal bandwidths greater than 1 MHz.

802.11 and 802.11a

One type of wideband signal is the signal used in WLANs using the Institute of Electrical and Electronic Engineers (IEEE) 802.11 standard. The IEEE 802.11 standard (802.11) outlines Media Access Control (MAC) and Physical Layer (PHY) specifications for WLANs.

The IEEE 802.11a standard (802.11a) is a part of 802.11 and addresses communications in high data rate wideband packetized wireless communication systems, covering frequencies of operation between 5 GHz and 6 GHz. 802.11a uses orthogonal frequency-division multiplexing (OFDM) modulation, which allows communication to occur at very high data rates by transmitting data over multiple frequency bins over a wide frequency range. All the discussions herein applicable to 802.11a is also applicable to IEEE 802.11g. The IEEE 802.11g OFDM standard is the same as 802.11a, with the exception of operating in the 2.4 Ghz band.

802.11 takes into account the successful and unsuccessful transmission of packets and includes mechanisms designed for dealing with packet transmission problems. For example, 802.11 allows for the retransmission by a transmitter of packets that were not received properly by a receiver.

Transmitters

A typical prior art transmitter 100 is depicted in FIG. 1A. Transmitter 100 includes an encoder 110, a modulator 120, a digital to analog converter (D/A) 130, a radio frequency (RF) front end 140, and an antenna 150, logically interconnected as shown in FIG. 1A.

802.11a wireless communication systems and other wireless communication systems can experience numerous problems during the transmission of signals.

Channel Effects—Fading and Multipath Communication Channels

For example, a wireless communication system could encounter channel effects, such as transmitting signals across a fading communication channel. The fading in the communication channel may be caused by multipath and propagation loss.

In the case of multipath channel, the RF energy that is transmitted between antennas experience destructive and constructive interference due to multiple paths taken by the RF energy with multiple delays on the way to a receive antenna. Such multipath interference modulates the phase and attenuates the amplitude of signals across all frequencies and carriers used by a wireless communication system. In a WLAN, such multipath interference could cause a receiver to receive a packet in error or to miss a packet entirely.

Antenna Diversity

Antenna diversity is a technique used to deal with fading and multipath communication channels. In a wireless communication system with transmit antenna diversity, a transmitter with multiple antennas, is used to transmit signals.

Switch Transmit Diversity

A typical prior art switching diversity transmitter 160 is shown in FIG. 1B. Diversity transmitter 160 includes encoder 110, modulator 120, D/A 130, RF front en 140, antenna switch 142, and multiple antennas 150, 164, logically interconnected as shown.

Prior art diversity transmitter 160 transmits the same information to RF front end 140, which then modulate the information and transmits the same signal via antennas 150, 164, respectively by switching between the two antennas. The downside of this technique is that it provides slow diversity. The antenna switching happens after the transmitter gets to know that the first signal transmission was in error. The delay could cause loss in throughput. The technique also requires a means of feedback from the receiver to the transmitter. Moreover, switching diversity provides limited diversity gain, since only the signal of the selected antenna is used at receiver. Whereas, optimum weighting of the signals transmitted from the antennas would result in greater diversity gain.

Transmit Beamforming

In a wireless communication system with antenna diversity, another way to achieve diversity is with transmit beamforming. With transmit beamforming, the wireless communication system includes a multiple antenna transmitter with transmit beamforming. A typical prior art multiple antenna transmitter with transmit beamforming 170 is shown in FIG. 1C. Multiple antenna transmitter with transmit beamforming 170 includes encoder 110, modulator 120, D/A 130, a transmit beam former 172, and multiple antennas 150, 174, logically interconnected as shown.

Prior art multiple antenna transmitter with transmit beamforming 170 sends information to be transmitted to transmit beam former 172, which then modulates and forms multiple RF signals for transmission on multiple antennas 150, 174, respectively. When modulating and forming the multiple RF signals, transmit beamformer 172, for each antenna 150, 174, weights each RF signal to be transmitted with a complex weight that includes a phase and an amplitude. Such prior art antenna diversity techniques may work well for narrowband signals, where the phase and weights are not frequency dependent. However, the conventional techniques would not work well for wideband signals that have transmitted phase and power that are not constant over the transmitted signal bandwidth and that are frequency dependent, such as 802.11a signals. Therefore, conventional antenna diversity techniques are not applicable to wideband signal wireless communication signals, such as 802.11a signals. Conventional antenna beamforming can not efficiently work for mobile nodes, since the beam can be focused in the wrong direction if the mobile nodes move. In addition environmental effects, such as movement of objects can change the communication channel between the beamforming transmit antennas and the receiver, therefore causing loss of connection.

Space-time Coding

Space-time coding is another way in which a wireless communication system with antenna diversity can encode signals for transmission. Space-time codes, use coding access antennas to achieve diversity gain. The coded signal is transmitted from multiple transmit antennas and is received by multiple receive antennas. A space-time decoder will decode the signal at the receiver. A simple space-time code is a delay-diversity code, where coding is done, by transmitting symbols and delayed replicas of those symbols from two or more antennas.

Such prior art antenna diversity techniques may work well for narrowband signals, where the phase and weights are not frequency dependent. However, the conventional techniques would not work well for wideband signals that have transmitted phase and power that are not constant over the transmitted signal bandwidth and that are frequency dependent, such as 802.11a signals. In addition space-time codes require special decoding processors that are not complaint with the 802.11a standard.

Therefore, a low cost and efficient multiple antenna transmitter beamforming technique is needed that is suited to confront the challenges posed by high data rate wideband packetized wireless communication signals, such as 802.11a signals, that implement frequency dependent weighting in beamforming wideband signals.

Thus, a system and method of low cost and efficient multiple antenna transmitter beamforming of high data rate wideband packetized wireless communication signals is needed.

SUMMARY OF THE INVENTION

The present invention provides a system and method of multiple antenna transmitter beamforming of a digital signal into M digital output signals ("M signals") in a wideband wireless packetized communication network.

In a preferred embodiment, each of the M signals are adapted for transmission onto a different communication channel, and each of the M signals are obtained from a complex signal that is split into sub-carriers in N frequency bins, wherein N is a positive integers greater than 1.

In a particular preferred embodiment, the system includes a transmit beamformer that phase steers and weights each of the sub-carriers for each of the N frequency bins corresponding to each of the M signals, thereby generating phase steered and weighted frequency data for each of the N frequency bins corresponding to each of the M signals. The transmit beamformer preferably includes a weight calculator that calculates complex weights for each of the sub-carriers based on estimates of the different communication channels, and a weighting block that applies the weights to the different sub-carriers to obtain the phase steered and weighted frequency data for each of the N frequency bins corresponding to each of the M signals. Further included in the particular preferred embodiment are M Inverse Fast Fourier Transform units (IFFTs) that each input the phase steered and weighted frequency data for each of the sub-carriers in the N frequency bins corresponding to each of the M signals and each convert the weighted frequency data for each of sub-carriers in the N frequency bins to obtain the M signals, wherein M is an integer greater than or equal to 2, with each the M signals being independently determined and adapted to shape an array antenna pattern.

The system can be further adapted so that the weight calculator, for each of the N frequency bins, converts channel estimates into a corresponding complex weight, thereby obtaining M weights for sub-carriers in each of the N frequency bins, and the weighting block includes M different weight blocks, wherein each weight block applies the complex weights to the different sub-carriers corresponding to one of the M signals to obtain the phase steered and weighted frequency data for the sub-carriers in the N frequency bins corresponding to that one of the M signals where M is an integer greater than or equal to 2.

In an exemplary embodiment, each IFFT processes the phase steered and weighted frequency data from the transmit beamformer sequentially such that each IFFT processes each of the N frequency bins in sequence.

DETAILED DESCRIPTION OF THE INVENTION

Figure 1A:
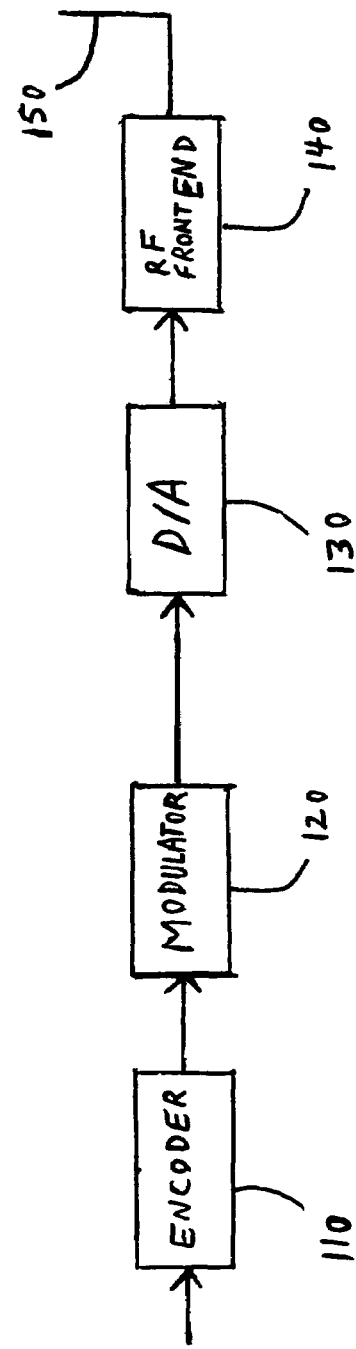
FIG. 1A is a diagram of a prior art transmitter.
Figure 1B:
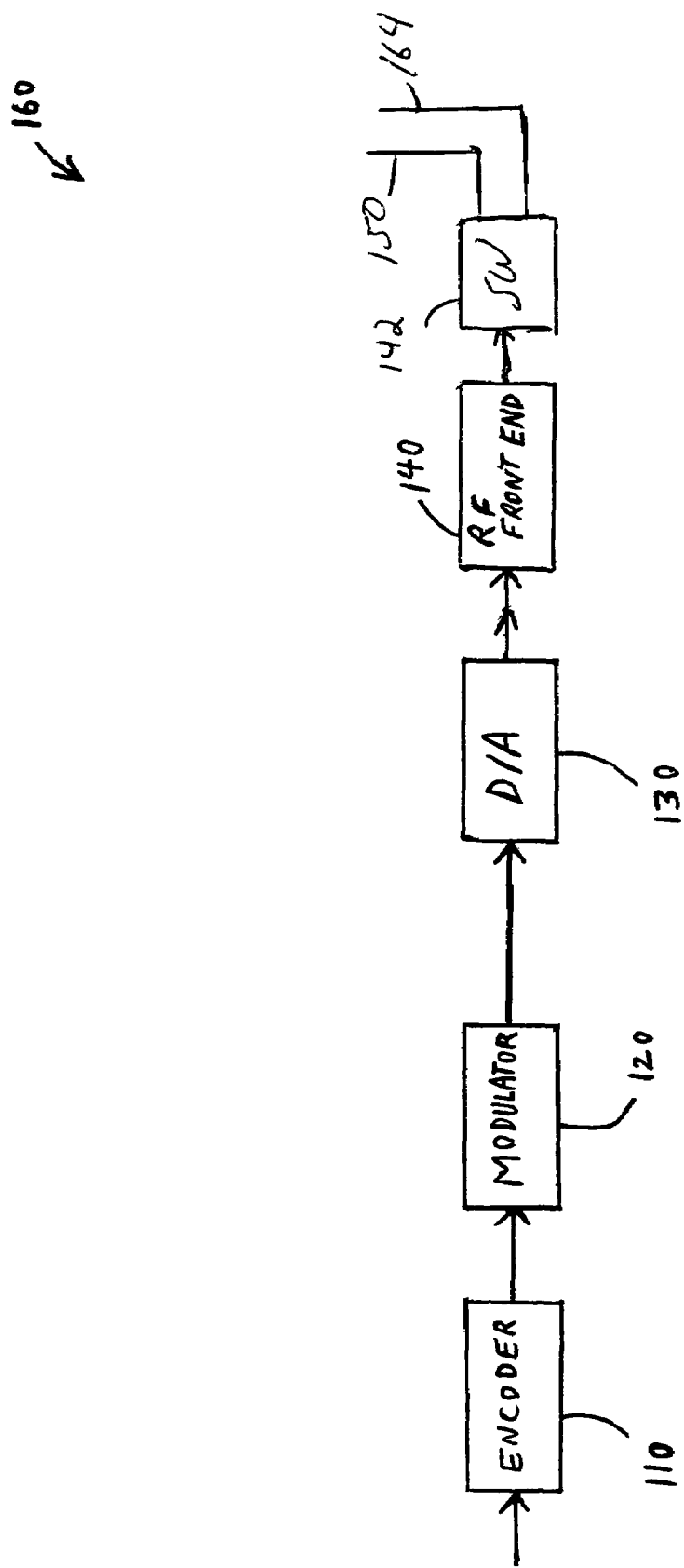
FIG. 1B is a diagram of a prior art multiple antenna transmitter.
Figure 1C:
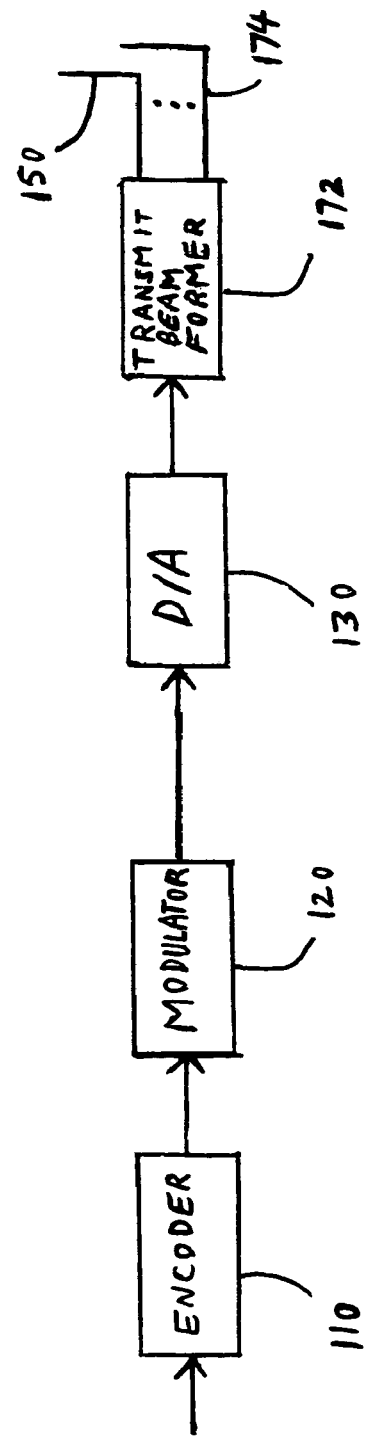
FIG. 1C is a diagram of a prior art multiple antenna transmitter with transmit beamforming.
Figure 2:
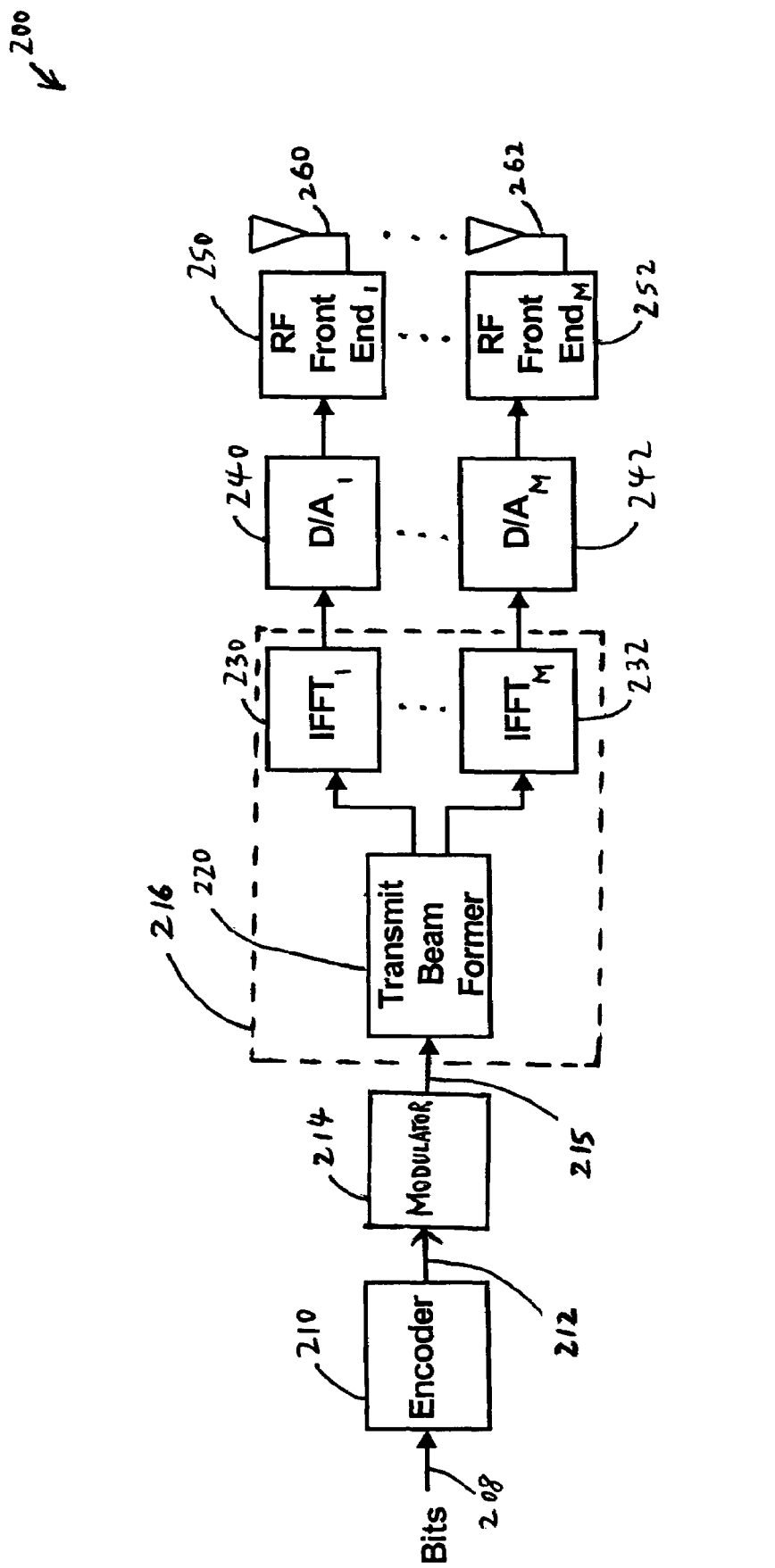
FIG. 2 is a block diagram of a multiple antenna transmitter beamformer in accordance with an exemplary embodiment of the present invention.

The present invention provides a system and method of multiple antenna transmitter beamforming of high data rate wideband wireless communication signals in a wideband wireless communication network. Referring to FIG. 2, in an exemplary embodiment having two transmit chains, the present invention provides a multiple antenna transmitter beamformer 216 that includes a transmit beamformer 220 and M Inverse Fast Fourier Transform units (IFFTs) 230, 232, logically interconnected as shown. While M is shown as equal to 2 in FIG. 2, M can be an integer greater than or equal to 2. In an exemplary embodiment, high data rate wideband wireless communication signals are packetized OFDM signals, and may be mobile, such as with a driver in a moving vehicle, or movable, such as movement within the confines of a building. To the extent that mobility is discussed herein, reference will be made to mobile, although it will be understood that this applies also to movable. In an exemplary embodiment, the packetized OFDM signals are 802.11a signals. In another exemplary embodiment, the packetized OFDM signals are 802.11g signals. In an exemplary embodiment, M equals 2. In another exemplary embodiment, M equals 4.

Multiple antenna transmitter combiner 216 is logically interconnected, as shown in FIG. 2, with an encoder 210, a modulator 214, M D/As 240, 242, M RF front ends 250, 252, and M antennas 260, 262, to form a multiple antenna transmitter 200. The multiple antenna RF front end includes M independent RF chains, including M synthesizers, with a common crystal. The common crystal will ensure common timing and common carrier frequency between the multiple chains. Co-pending U.S. patent application Ser. No. 10/139, 137, entitled DUAL FREQUENCY BAND WIRELESS LAN, filed May 3, 2002, and U.S. Pat. No. 6,351,502 describe exemplary RF front ends, such as RF front ends 250, 252, which are each hereby incorporated by reference.

Multiple/Single Channel Operation

In an exemplary embodiment the multiple antenna electronic chipset formed with circuits as described herein has two chains operating in one frequency band (M=2), and another two chains operating in a different frequency band. In another exemplary embodiment the multiple antenna electronic chipset formed with circuits as described herein has four chains, operating in one frequency band.

Operation

Encoder 210 encodes high data rate wideband wireless packetized communication bits 208 of the high data rate wideband wireless packetized communication signals into coded bits 212. In an exemplary embodiment, encoder 210 is a convolutional encoder. Then, modulator 214 modulates coded bits 212 such that they are mapped to complex signals 215.

Transmit beamformer 220 steers and weights complex signals 215 on a per-subcarrier basis, for each of the sub-carriers containing data, one in each of N frequency bins, to be transmitted by multiple antenna transmitter 200, thereby generating phase steered and weighted frequency data for each sub-carrier, where N is a positive integer. In an exemplary embodiment, N equals 52, the number of frequency bins used in an 802.11a/g signal.

IFFTs 230, 232 convert the phase steered and weighted frequency data for each subcarrier from transmit beamformer 220 into digital outputs. D/As 240, 242 convert the digital outputs of IFFTs 230, 232, respectively, into analog, baseband outputs. RF front ends 250, 252 modulate the baseband outputs from D/As 240, 242, respectively, into RF signals. Then, antennas 260, 262 transmit the RF signals from RF front ends 250, 252, respectively.

Transmit beamformer 220 performs transmit beamforming on complex signals 215. In particular, a digital signal for which transmission is required is split into M different digital signals, one for each transmit chain, each of which contain the same raw data, but each of which is subsequently phase steered and weighted to correspond to the antenna and/or channel that will be used for transmission. Accordingly, transmit beamformer 220 finds and modifies the phase and amplitude of each digital signal 215 in the baseband for each antenna 260, 262 in order to shape an array antenna pattern to counter channel effects from each channel coupled to each transmit antenna 260, 262, respectively.

Figure 3:
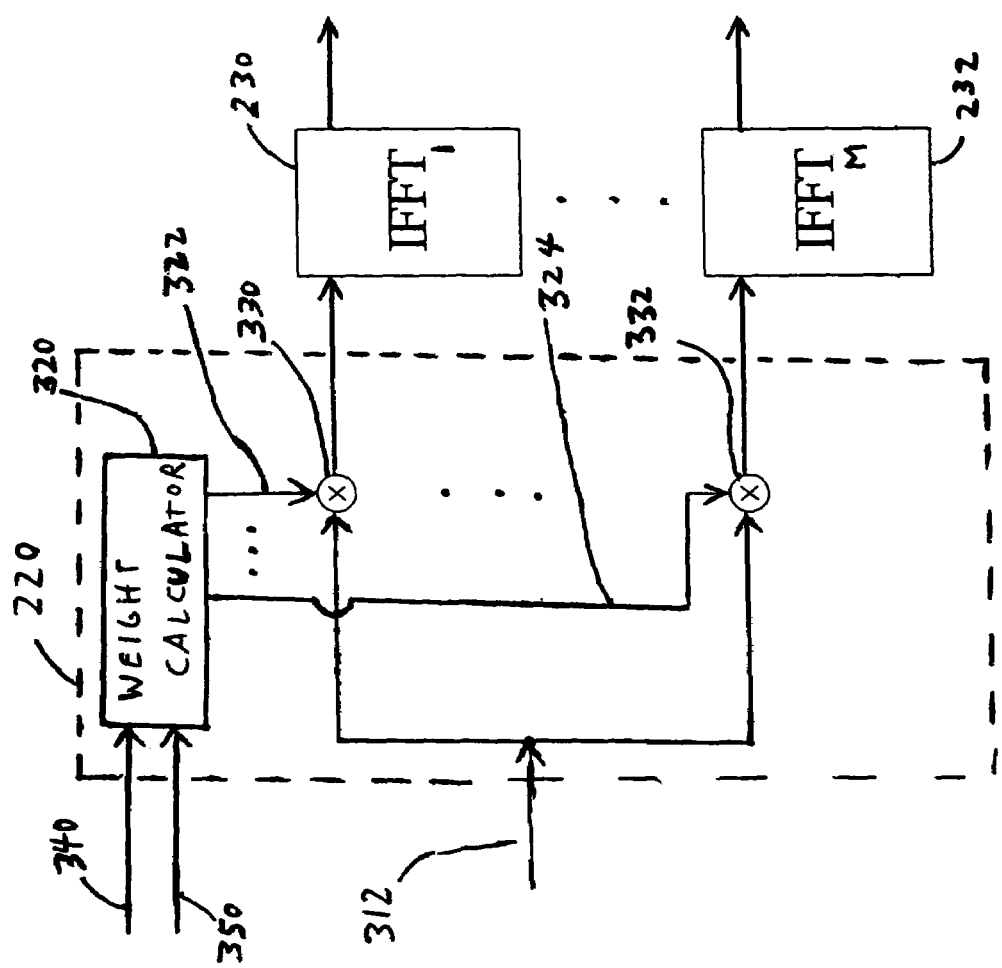
FIG. 3 is a block diagram of a transmit beamformer in accordance with an exemplary embodiment of the present invention.

Referring to FIG. 3, in an exemplary embodiment, transmit beamformer 220 includes a weight calculator 320, and M weight blocks 330, 332 which are logically coupled to IFFTs 230, 232, respectively.

An embodiment of the transmit beamformer will now be described for the instance in which M=2.

Weight Calculator

For each frequency bin, $f_i$, weight calculator 320 converts channel estimates 350 into M weights (shown as 322, 324 for M weight blocks 330, 332, respectively). Gain data 340 can also be used if desired in establishing M weights for each frequency bin. Therefore, weight calculator 320 generates M×N weights for M weight blocks 330, 332. For each frequency bin, $f_i$, each weight 322, 324 is the optimal beamforming weighting vector for antenna 260, 262, respectively. In an exemplary embodiment, weight calculator 320 obtains analog gain data 340 from a receiver and obtains channel estimate 350 from the receiver. In an exemplary embodiment, the receiver is a multiple antenna receiver that receives signals on antennas 260, 262. An exemplary multiple antenna receiver is described in copending and commonly owned U.S. patent application entitled "Apparatus And Method Of Multiple Antenna Receiver Combining Of High Data Rate Wideband Packetized Wireless Communication Signals" (Ser. No. 10/682,787) filed Oct. 8, 2003.

Weighting Block

A weighting block contains a plurality of weight blocks. For each frequency bin, $f_i$, (and with M=2) weight blocks 330, 332, with weights 322, 324, respectively, (1) steers and (2) preferably weights, the ith raw frequency data 312 (also referred to as the sub-carrier data) based on estimates 350 of the signal quality, such as the signal-to-noise ratio (SNR), the signal to interference ratio, or the signal to noise plus interference ratio of the channels coupled to antennas 260, 262, respectively, and (3) are logically coupled to IFFTs 230, 232, respectively. The SNR estimate is preferred over the signal to interference ration and the signal to noise plus interference ratio because the recipient may have a different interference level than the sender. Also, in a preferred embodiment, both steering and weighting are performed, but steering without weighting has advantages as well. Therefore, for the ith frequency bin, $f_i$, the jth weight block, with a weight$_{j,i}$, each of the weighting blocks (1) steers and (2) weights the ith raw frequency data 312 to a jth channel estimate 350, based on the signal quality characteristic of the jth channel coupled to the jth antenna, and (3) is logically coupled to the jth IFFT, where j is a positive integer greater than or equal to 2 and less than or equal to M. Thus, for each frequency bin, $f_i$, weight blocks 330, 332 output phase steered and weighted frequency data to IFFTs 230, 232, respectively.

Weight Normalizations

For each frequency bin, $f_i$, weights 322, 324 need to be normalized. In order to find the desired power for each chain, two power constraints should be considered: (1) EIRP (Effective Isotrophic Radiated Power) limit, (2) per-chain power limit. We first normalize the beamforming weights, which are given by gain-adjusted channel estimates, to satisfy both constraints. Then the desired power for each chain can be computed.

If EIRP is limiting, then run EIRP-based algorithm for weight normalization to make sure both EIRP limit and power limit are satisfied; Otherwise, run the power-based algorithm. The reason for having two different algorithms is that the power-based algorithm is much simpler and provides a slightly better multipath mitigation property but it only operates correctly if the EIRP is not being limited.

EIRP-based Algorithm

The beamforming weights should satisfy a couple of power constraints: EIRP (Effective Isotropic Radiated Power) limit per subchannel and power sum limit per chain. Let $W_{j,i}$ be the beamforming weights for the $i^{th}$ bin of the $j^{th}$ chain. Then $W_{j,i}$ must satisfy the following criterion.

$$\left|\sum_{j=1}^{N_t} |W_{j,i}|\right|^2 \le P_{eirp}, \forall\, i$$

$$\sum_{i=1}^{N_f} |W_{j,i}|^2 \le P_j$$

where $N_t$ is the number of transmit chains, $N_f$ is the number of subchannels, $P_{eirp}$ is the EIRP limit per subchannel, and $P_j$ is the total power limit for the $j^{th}$ chain. Note that $$\left|\sum_{j=1}^{N_t} |W_{j,i}|\right|^2$$

in the formula is the coherent power for the $i^{th}$ subchannel and $$\sum_{i=1}^{N_f} |W_{j,i}|^2$$

is the power sum for the $j^{th}$ chain.

Finding the beamforming weights that optimize the performance while satisfying the above power constraints is complex. Therefore, a suboptimal algorithm has been developed. The basic steps in the suboptimal algorithm for two chains are summarized as follows:

1. Start with $$W_{j,i} = \frac{\hat{H}_{j,i}^*}{G_j},$$

where $\hat{H}_{j,i}$ is the channel estimate of the $i^{th}$ subchannel of the $j^{th}$ chain, $\hat{H}_{j,i}^*$ is the complex conjugate of $\hat{H}_{j,i}$, and $G_j$ is the total gain of the $j^{th}$ chain.

2. Scale $W_{j,i}$ such that each subchannel satisfies the EIRP limit:

$$\tilde{W}_{j,i} = \frac{W_{j,i}}{\sum_{j=1}^{N_t}|W_{j,i}|}\sqrt{P_{eirp}}$$

3. Check whether there is a chain that exceeds the power sum constraint. If not, the algorithm is finished. Otherwise, go to the step 4.
4. Drop the power of the chain that exceeds the power sum constraint. Without loss of generality, assume the first chain exceeds the power sum constraint. Then it should be scaled down by the following factor.

$$r_1 = \sqrt{\frac{P_1}{\sum_{i=1}^{N_f}|\tilde{W}_{1,i}|^2}} < 1$$

5. If the second chain also exceeds the power sum limit, scale the second chain such that its power is same as the limit. Otherwise, there could be a room for EIRP since the power for the first chain has been dropped. The amount of power increase for the second chain will be determined as follows:

$$r_1|\tilde{W}_{1,i}| + r_{2,i}^1|\tilde{W}_{2,i}| = \sqrt{P_{eirp}}$$

$$r_2^1 = \min(r_{2,i}^1) = \min\left(1 + \frac{(1-r_1)|\tilde{W}_{1,i}|}{|\tilde{W}_{2,i}|}\right)$$

$$r_2^2 = \sqrt{\frac{P_2}{\sum_{i=1}^{N_f}|\tilde{W}_{2,i}|^2}}$$

$$r_2 = \min(r_2^1, r_2^2)$$

where $r_2^1$ is based on the EIRP constraint, and $r_2^2$ is from the power sum constraint. Other algorithms can also be used.

Power-based Algorithm

When EIRP is not a limiting factor, we can use spectral flatness (constant power) as a criterion for weight normalization. This power-based algorithm will yield the same weights as EIRP-based algorithm for flat channels. It is also apparent that the power-based algorithm is much simpler in the case when EIRP is not limiting.

The basic procedures of the power-based normalization algorithm are as follows:

1. Start with $$W_{j,i} = \frac{\hat{H}_{j,i}^*}{G_j}$$

2. Scale $W_{j,i}$ such that each subchannel has the constant power-sum.

$$\tilde{W}_{j,i} = \frac{W_{j,i}}{\sqrt{\sum_{j=1}^{N_t}|W_{j,i}|^2}}$$

3. Assign the maximum power $P_j$ to each chain.

Equal Gain Weighting

As mentioned previously, the present invention also provides for phase steering, irrespective of weighting. In this embodiment, equal gain weights are preferably used. If only phase steering is performed, the following algorithm applies $$W_{j,i} = \frac{H_{j,i}^*}{\|H_{j,i}\|}$$

with the variables used having been previously defined. Since weighting is not being used, it is preferable to assign the maximum power $P_j$ to each chain.

Weight Resolution

In an exemplary embodiment, weights 322, 324 are represented in lower resolution, taking one of K values. Where in an exemplary embodiment K is eight. With lower resolution weights, weight blocks 330, 332 can be implemented with less hardware and space on an electronic chip.

In case K equals eight, each weight 322, 324 can have one of eight values, and weight blocks 330-332 would be 3-bit weight blocks. Hence, we use a 3-bit by 12 bit weight multiplier, which is much smaller than a 12 bit by 12 bit multiplier unit if the weights were represented by 12 bit values. Thus, this design decreases circuit complexity and minimizes any decrease in performance of multiple antenna transmitter by using 3-bit by 12 bit multipliers.

In another exemplary embodiment, weights 322, 324 have full resolution. In one exemplary embodiment, full resolution is 8 bits. In order to reduce the complexity of the multiplier, only the most 12 significant bits of the multiplier output are used. In another exemplary embodiment, the resolution of the weights 322, 324, is less than or equal to half of the resolution of the data. Hence, significantly reducing the multiplier complexity.

Inverse Fast Fourier Transforms

For each frequency bin, $f_i$, IFFTs 230, 232 convert the phase steered and weighted frequency data from transmit beamformer 220 into digital outputs. Each IFFT 230, 232 processes the phase steered and weighted frequency data sequentially, such that it processes each frequency in sequence. Thus, for the ith frequency bin, $f_i$, both IFFT 230 and IFFT 232 process ith phased steered and weighted frequency data from transmit beamformer 220.

Determining the Channel

In order to perform transmit beam forming, multiple antenna transmitter 200 obtains knowledge about the channels that it transmits signals on. Multiple antenna transmitter 200 can obtain the channel knowledge about the channels, channel knowledge, in several ways.

One way is to use the receiver channel estimate to find the transmit weights. This is self-calibrating to the antenna position. When the antenna position changes, the received channel estimate reflects the new antenna positions.

Different types of packets can be used by the receiver for the purpose of channel estimation: The ACK packets, the CTS packets, which are broadcast packets, and the data packets are examples.

Channel Estimation by Receiver

Initially diversity transmitter 200 extracts the channel knowledge from its receiver. When receiving data the diversity transmitter stores the channel information, and uses that information during transmission. In an exemplary embodiment, the receiver is a multiple antenna receiver that receives signals on antennas 260, 262. An exemplary multiple antenna receiver is described in copending and commonly owned U.S. patent application entitled "Apparatus And Method Of Multiple Antenna Receiver Combining Of High Data Rate Wideband Packetized Wireless Communication Signals" (Serial Number to be assigned, bearing Ser. No. 10/682,787) filed Oct. 8, 2003.

Methods to Store and Compress Channel Estimates

In an exemplary embodiment, the transmitter has a table of channel estimates for all the nodes in the network. The transmitter can be an access point (AP) or in a station Ad Hoc mode, i.e. where it functions as an access point. The channel estimates for each wireless network node is updated every time a new estimate of the channels from that network node is received.

In an exemplary embodiment, the channel estimate data is encoded and compressed, in order to reduce the amount of storage memory required to store the data.

In a large network with many of nodes, and multitude of transmit/receive antennas, the storage memory space could be large. For an 802.11 network, 128 nodes can exist in a single access point network. Given 4 transmit antennas, 512 complex channel estimates, each 12 bits long, need to be stored. Using data compression on the channel estimates, the storage space can be reduced by a factor of at least two.

Channel Reciprocity

Multiple antenna transmitter 200 can obtain and use the channel knowledge from a receiver using the same channel due to channel reciprocity. Channel reciprocity is the assumption that the channels used by the receiver can also be used by multiple antenna transmitter 200 given that the channels have not changed. Thus, with channel reciprocity, weight calculator 320 obtains channel estimate 350 from the receiver. In an exemplary embodiment, the receiver is a multiple antenna receiver that receives signals on antennas 260, 262. An exemplary multiple antenna receiver is described in copending and commonly owned U.S. patent application entitled "Apparatus And Method Of Multiple Antenna Receiver Combining Of High Data Rate Wideband Packetized Wireless Communication Signals" (Serial Number to be assigned, bearing Ser. No. 10/682,787) filed Oct. 8, 2003.

Dealing with Channel Mismatch

In certain circumstance, channel reciprocity may not exist. For example, reciprocity may not exist when there is channel mismatch, where the channel information used by the receiver no longer reflects the channels to be used by multiple antenna transmitter 200. Channel mismatch may occur when a channel changes because either multiple antenna transmitter 200 moved or the receiver moved. Also, channel mismatch may occur when the channel changes because the environment in which communication occurs changes. In addition, channel mismatch may occur when circuit mismatches exist between the receiver circuits used to estimate the channel and the transmitter circuits, such as mismatches in gain and phase of the paths. Also, channel reciprocity may not be assumed with FDD systems. In Frequency Division Duplexing (FDD) separate frequency bands (channel) are used for transmit and receive, hence the two channels won't be reciprocal.

The performance of multiple antenna transmit beamformer 216 can depend on the amount of channel mismatch that exists. Multiple antenna transmitter 200 can cope with channel mismatch in several ways: channel aging mechanism, using RTS/CTS mode, and calibration.

Channel Aging Mechanism

In an exemplary embodiment, for each channel to be transmitted on, a threshold of channel aging is set that depends on the time since the channel estimate was obtained. In an exemplary embodiment, multiple antenna transmitter 200 sets the threshold of channel aging. If the time since the channel estimation was received exceeds the set threshold, then multiple antenna transmitter 200 will not use the timed out channel estimate and will obtain a new channel estimate, typically by taking one of the following actions:

Initiates a Request to send packet (RTS), which forces the mobile node with which it is communicating to send a packet to multiple antenna transmitter 200 via a Clear-to-Send (CTS) packet. The RTS/CTS is a function of the MAC layer.

Transmits using one of the broadcast methods discussed later in Broadcasting Methods section.

RTS-CTS Mode

Figure 4:
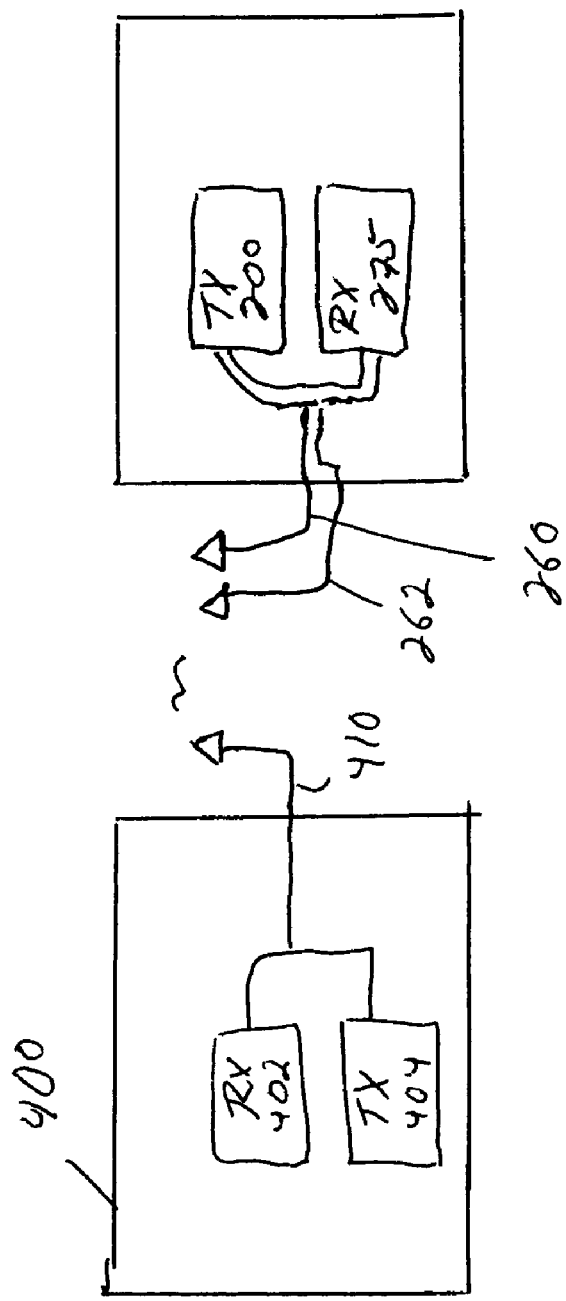
FIG. 4 illustrates RTS-CTS channel updating in accordance with an exemplary embodiment of the present invention.

As mentioned above and as shown in FIG. 4, when a channel timeout occurs, then channel estimate 350 is deemed to be outdated and unusable by multiple antenna transmitter 200. In this situation, in an exemplary embodiment, multiple antenna transmitter 200 uses a RTS-CTS operation to determine the channel knowledge.

In the RTS-CTS operation, in an exemplary embodiment, multiple antenna transmitter 200 broadcasts an RTS signal. Then, a receiver 402 within transceiver 400, which can have a single or multiple antennas associated therewith, but is shown as a single antenna 410, that receives the transmitted RTS signal uses a transmitter 404 associated with transceiver 400 to transmit a CTS signal to antennas 260, 262 and the receiver 275 associated with transmitter 200. A channel estimate is extracted from the received CTS signal. Thereafter, transmit beamformer 220 performs transmit beamforming.

Calibration

In another embodiment, weight calculator 220 calibrates channel information for each channel in order to reduce channel mismatch caused by circuit mismatches. For example, for each of the N frequency bins, since RF gains may be different for the M receive chains of a multiple antenna receiver that receives signals on antennas 260, 262, in an exemplary embodiment, weight calculator 320 adjusts channel estimates 350 before generating M weights 322, 324. For each frequency bin, $f_i$, since channel estimates 350 include the RF gains, $G_1$, $G_M$ of the multiple antenna receiver, weight calculator 220 adjusts channel estimates 350 according to the following equations:

$$H_1 \approx \frac{\hat{H G_1}}{(G\min/G_1)} \text{ and } H_M \approx \frac{\hat{H G_M}}{(G\min/G_M)}.$$

$\hat{H G_1}$ is the channel estimate of the channel coupled to antenna 260, while $\hat{H G_M}$ is the channel estimate of the channel coupled to antenna 262.

Hidden Node Problem

A multiple antenna transmitter transmits signals to a particular receiver by focusing RF energy to the particular receiver on a particular channel. With a prior art multiple antenna transmitter, a hidden-node problem may exist where other transmitters may not receive the transmission from the multiple antenna transmitter. Thus, the other transmitters may consider the channel as being idle and send their own data on the channel, thereby interfering with the transmitted signals from the multiple antenna transmitter.

Dealing with Hidden Node Problems

In order to avoid hidden node problems, in an exemplary embodiment, when transmitting RF signals on antennas 260, 262 to a particular receiver, multiple antenna transmitter 200 broadcasts a CTS signal. By sending the CTS signal, multiple antenna transmitter 200 indicates to other transmitters to not transmit for a certain amount of time. After sending the CTS signal, multiple antenna transmitter 200 transmitter uses transmit beamforming to transmit signals to the desired receiver.

Broadcasting Methods

When broadcasting packets, such as in the RTS/CTS mode, or to avoid hidden node problem, the multiple antenna transmitter can take one of the following actions:

Transmit the broadcast packets from a single default antenna. This default antenna can be based on which transmit antenna has delivered best packet reception to associated different nodes. Different antennas at different times can also be the default antenna.

Transmit the broadcast packets from multiple antennas, each antenna used to broadcast a separate part of the frequency band.

It is also noted that there are different types of broadcast packets, and different types of broadcast packets can be broadcast differently. For example, when sending beacons, a specific antenna can be used as the default antenna, which may not the default antenna for other types of packets, including other broadcast packets.

Combined with a Multiple Antenna Receiver

In an exemplary embodiment, multiple antenna transmitter 220 may be packaged in a single electronic chip with a multiple antenna receiver combiner to form a multiple antenna receiver/transmitter combiner/beamformer system. An exemplary multiple antenna receiver combiner is described in copending and commonly owned U.S. patent application entitled "Apparatus And Method Of Multiple Antenna Receiver Combining Of High Data Rate Wideband Packetized Wireless Communication Signals" (Serial Number to be assigned, bearing Ser. No. 10/682,787) filed Oct. 8, 2003. The channel estimation and weights used by the multiple antenna receiver combiner provide the multiple antenna transmitter with the channel estimates and transmitting weights, which are the same as the receiver combining weights, except for a normalization factor.

Combined with Another Multiple Antenna Transmitter

In an exemplary embodiment, multiple antenna transmitter 220, can be communicating with another multiple antenna transmitter. The present invention permits that since it does not predicate the other mobile node transmitter to be single or multiple antenna. The multiple antenna transmitter 220, transmits to the other multiple antenna transmitter, by using the channel estimates received from the other multiple antenna transmitter when receiving packets transmitted by that mobile node.

Disabling Multiple Antenna Beamforming

When the multiple antenna transmissions fail for K consecutive transmissions, the multiple antenna transmitter reverts to using a single default antenna for transmission, where K is an integer value greater or equal to 2. The consecutive failures can happen for a number of reason: rapid channel changes, mobile or access point fast mobility, or non-reciprocity of transmit and receive channels.

Power Control

Scaling for Digital Signals

The transmit signals with TxBf may have different size in the digital domain, depending on the weights obtained by the normalization algorithm. The signals need to be scaled before the digital to analog converter, such as D/A's 240, 242, for two reasons. First, the quantization noise and clipping distortion are both reduced by covering the full dynamic range of the D/A. If the signal is too small, quantization noise will increase while if the signal is too large, clipping distortion will increase. Second, since the transmit power control feedback loop in the analog RF transmit chain may assume a constant signal power going into it. Thus we have to make sure the power of the input to D/A remains same from packet to packet.

The condition that gives the same power for beamformed signal as the single-chain is given by $$\sum_{i=1}^{52} |\tilde{w}_{j,i}|^2 = 52 \quad \text{for } \forall\, j$$

Therefore, the scaling factor would be $$r_d = \sqrt{52 \Big/ \sum_{i=1}^{52} |\tilde{w}_{j,i}|^2}$$

for the longs, signal symbol, and data symbols.

Note that the shorts are occupying just 12 bins, and thus different scaling is necessary for the shorts. As a result, the shorts should have the same power as the rest of the packet since the analog power control is performed with the shorts. The scaling for the shorts thus is $$r_s = \sqrt{12 \Big/ \sum_{i \in \{12bins\}} |\tilde{w}_{j,i}|^2}.$$

Interaction of Beamforming with Peak Power Detector

Typical analog power control loops can be based on a peak detection circuit. The reason is that it is fairly easy to build a peak detector rather than a more complicated power detector. Since the PAR (Peak-to-Average Ratio) is predetermined for the shorts, it is possible to convert the peak power to average power.

Since each packet will likely use different beamforming weights, the time-domain wave form of the short sequence will be different for each packet. Therefore, the PAR of the beamformed shorts should be calculated for each packet in advance, and peak value need to be adjusted accordingly.

There is another aspect that deserves attention. The original short sequence has its own particular structure (which is known), that makes its amplitude periodic with 400 nsec. With arbitrary beamforming weights, the amplitude of the shorts can't be always periodic with 400 nsec. Therefore, the sampling period of peak detection circuit should be now at least 800 nsec, which is the period of the short sequence.

Conclusion

The present invention relates to wireless communications. More particularly, the invention relates to a system and method of multiple antenna transmitter beamforming of high data rate wideband packetized wireless communication signals.

Having fully described a preferred embodiment of the invention and various alternatives, those skilled in the art will recognize, given the teachings herein, that numerous alternatives and equivalents exist which do not depart from the invention. It is therefore intended that the invention not be limited by the foregoing description, but only by the appended claims.

The invention claimed is:

1. An apparatus for multiple antenna transmitter beamforming M digital output OFDM signals ("M signals") each including sub-carrier data in N frequency bins in a wideband wireless packetized communication network, wherein the M signals are each adapted for transmission onto different communication channels, and wherein each of the M signals are obtained from a same single digital signal, wherein N is a positive integer greater than 1, the apparatus comprising:
   a transmit beamformer adapted to phase steer and weight the sub-carrier data in each of the N frequency bins for each of the M signals, thereby generating phase steered and weighted frequency data for each of the M signals, wherein the transmit beamformer includes:
   a weight calculator adapted to calculate M complex weights for each of the N frequency bins based on channel estimates of the different communication channels; and
   a weighting block adapted to apply the M complex weights to the sub-carrier data corresponding to each of the N frequency bins for each of the M signals to obtain the phase steered and weighted frequency data for each of the M signals,
   wherein at least some of the M complex weights are normalized to satisfy an Effective Isotropic Radiated Power (EIRP) limit and a per-chain power limit; and
   M Inverse Fast Fourier Transform units (IFFTs) that are each adapted to input the phase steered and weighted frequency data for one of the M signals and each convert the phase steered and weighted frequency data corresponding to that one M signal to obtain that one M signal, wherein M is an integer greater than or equal to 2, such that the M signals are adapted to shape a distinct array antenna pattern.

2. The apparatus according to claim 1 wherein:
   the weight calculator, for each of the N frequency bins, converts the channel estimates into corresponding complex weights, thereby obtaining the M complex weights for each of the N frequency bins; and
   the weighting block includes M different weight blocks, wherein each weight block applies corresponding complex weights to the sub-carrier data corresponding to one of the M signals to obtain the phase steered and weighted frequency data for that one M signal.

3. The apparatus according to claim 2 wherein the weight calculator further includes using gain data in determining at least certain ones of the complex weights.

4. The apparatus according to claim 1 wherein each IFFT sequentially processes the phase steered and weighted frequency data from each of the N frequency bins for the corresponding M signal.

5. The apparatus according to claim 1 wherein the weight calculator further includes using gain data in determining at least certain ones of the complex weights, and obtains the gain data from a receiver.

6. The apparatus according to claim 5 wherein the transmit beamformer is part of a transmitter, and the receiver and the transmitter share an antenna.

7. The apparatus according to claim 5 wherein the transmit beamformer is part of a transmitter, and the receiver and the transmitter share multiple antennas.

8. The apparatus according to claim 1 wherein the weight calculator obtains the channel estimates from a receiver.

9. The apparatus according to claim 8 wherein the transmit beamformer is part of a transmitter, and the receiver and the transmitter share an antenna.

10. The apparatus according to claim 8 wherein the transmit beamformer is part of a transmitter, and the receiver and the transmitter share multiple antennas.

11. The apparatus according to claim 8 wherein the channel estimates obtained from the receiver are for different channels received over a period of time.

12. The apparatus according to claim 11 wherein the communication channels used correspond to those communication channels for which channel estimates are obtained.

13. The apparatus according to claim 8 wherein the weight calculator obtains the channel estimate for a particular frequency bin for a particular communication channel.

14. The apparatus according to claim 1 wherein the EIRP limit and the per-chain power limit are used where the EIRP is limiting, otherwise spectral flatness is used, wherein at least some of the M complex weights for each of the N frequency bins are spectral flatness weights that assign constant power for each of the N frequency bins, thereby keeping spectral flatness across all of the N frequency bins for at least some of the M signals.

15. The apparatus according to claim 1 wherein at least one of the M complex weights for each of the N frequency bins is a discretized complex weight having a lower resolution than full resolution.

16. The apparatus according to claim 15 wherein the discretized complex weight is represented by a pair of 3-bit binary numbers.

17. The apparatus according to claim 15 wherein each of the M weight blocks is a 12-bit×3-bit multiplier.

18. The apparatus according to claim 1 wherein the weight calculator, for each of the N frequency bins, adjusts the channel estimate before generating the M complex weights in order to reduce channel mismatch caused by circuit mismatches.

19. The apparatus of claim 1 further comprising:
M D/As that each convert one of the M digital outputs of the IFFTs into one of a plurality of analog, baseband outputs;
M RF front ends that each modulate one of the analog baseband outputs from one of the M D/As into a radio frequency (RF) signal; and
M antennas that each transmit one of the RF signals from one of the M RF front ends.

20. The apparatus according to claim 19 in which the transmit beamformer further operates in a broadcast mode, during which broadcast mode one of the M antennas is used for transmission.

21. The apparatus according to claim 20, wherein during the broadcast mode only one of the M antennas is used for transmission.

22. The apparatus according to claim 20 wherein the one of the M antennas sends a Request-to-Send (RTS) signal.

23. The apparatus according to claim 22 wherein a new channel estimate is extracted from a Clear to Send (CTS) signal that is received in response to the sent RTS signal.

24. The apparatus according to claim 1 wherein a channel estimate aging threshold is set so that if the channel estimate becomes outdated, the outdated channel estimate is not used.

25. The apparatus according to claim 24 wherein, in response to the setting of the channel estimate aging threshold, an updated channel estimate is obtained from a Clear-to-Send CTS) signal that is received in response to a sent Request to Send (RTS) signal.

26. The apparatus according to claim 19 wherein at least one of the M antennas transmits a CTS signal, thereby indicating to other transmitters to not transmit for a certain amount of time, thereby avoiding hidden node problems.

27. The apparatus according to claim 1 wherein the M signals are one of 802.11a and 802.11g signals.

28. The apparatus according to claim 1 wherein M equals 2.

29. The apparatus according to claim 1 wherein M equals 4.

30. The apparatus according to claim 1 wherein a separate antennae is used to transmit an RF signal corresponding to each of the M signals.

31. The apparatus according to claim 1 wherein a separate antennae is used to transmit an RF signal corresponding to the same frequency bin or frequency bins in each of the M signals.

32. The apparatus according to claim 1 wherein during a broadcast mode M antennas are used to transmit M RF signals that together correspond to a broadcast signal, and wherein one of the M antennas transmits an RF signal corresponding to a portion of that digital output that represents sub-carriers from some of the frequency bins, and each of the other of the M antennas transmits an RF signal corresponding to another portion of that digital output that represents sub-carriers from the other ones of the frequency bins.

33. The apparatus according to claim 1 further including M antennas, and wherein less than all of the M antennas are used to transmit RF signals, and wherein the less than all of the M antennas transmit on communication channels having a predetermined quality measure.

34. The apparatus according to claim 1 wherein the array pattern is shaped to counter channel effects.

35. The apparatus according to claim 1 wherein the distinct array antenna pattern includes a plurality of distinct spatial patterns, one for each frequency bin.

36. A method of multiple antenna transmitter beamforming M digital output OFDM signals ("M signals") each including sub-carrier data in N frequency bins in a wideband wireless packetized communication network, wherein the M signals are each adapted for transmission onto different communication channels, and wherein each of the M signals are obtained from a same single digital signal, wherein N is a positive integer greater than 1, the method comprising:
phase steering and weighting the sub-carrier data in each of the N frequency bins for each of the M signals, thereby generating phase steered and weighted frequency data for each of the M signals, wherein phase steering and weighting includes:
calculating M complex weights for each of the N frequency bins based on channel estimates of the different communication channels, wherein at least some of the M complex weights are normalized to satisfy an Effective Isotropic Radiated Power (EIRP) limit and a per-chain power limit; and applying the M complex weights to the sub-carrier data corresponding to each of the N frequency bins for each of the M signals to obtain the phase steered and weighted frequency data for each of the M signals; and converting the phase steered and weighted frequency data corresponding to each of the M signals using an Inverse Fast Fourier Transform (IFFT) to obtain the M signals, wherein M is an integer greater than or equal to 2, such that the M signals are adapted to shape a distinct array antenna pattern.

37. The method according to claim 36 wherein the step of calculating includes using gain data in determining at least certain ones of the complex weights.

38. The method according to claim 36 wherein each IFFT sequentially processes the phase steered and weighted frequency data from each of the N frequency bins for the corresponding M signal.

39. The method according to claim 36 wherein the step of calculating includes using gain data in determining at least certain ones of the complex weights, and obtains the gain data from a receiver.

40. The method according to claim 39 further including the steps of transmitting the M signals, and receiving signals, and wherein the steps of transmitting and receiving share an antenna.

41. The method according to claim 39 further including the steps of transmitting the M signals, and receiving signals, and wherein the steps of transmitting and receiving share multiple antennas.

42. The method according to claim 36 wherein the step of calculating obtains the channel estimates from a receiver.

43. The method according to claim 42 further including the steps of transmitting the M signals, and receiving signals, and wherein the steps of transmitting and receiving share an antenna.

44. The method according to claim 42 further including the steps of transmitting the M signals, and receiving signals, and wherein the steps of transmitting and receiving share multiple antennas.

45. The method according to claim 42 wherein the channel estimates obtained from the receiver are for different channels received over a period of time.

46. The method according to claim 45 wherein the communication channels used correspond to those communication channels for which channel estimates are obtained.

47. The method according to claim 42 wherein the step of calculating obtains the channel estimate for a particular frequency bin for a particular communication channel.

48. The method according to claim 36 wherein the EIRP limit and the per-chain power limit are used where the EIRP is limiting, otherwise spectral flatness is used, wherein at least some of the M complex weights for each of the N frequency bins are spectral flatness weights that assign constant power for each of the N frequency bins, thereby keeping spectral flatness across all of the N frequency bins for at least some of the M signals.

49. The method according to claim 36 wherein at least one of the M complex weights for each of the N frequency bins is a discretized complex weight having a lower resolution than full resolution.

50. The method according to claim 49 wherein the discretized complex weight is represented by a pair of 3-bit binary numbers.

51. The method according to claim 49 wherein each of the M weight blocks is a 12-bit×3-bit multiplier.

52. The method according to claim 36 wherein the step of calculating, for each of the N frequency bins, adjusts the channel estimate before generating the M complex weights in order to reduce channel mismatch caused by circuit mismatches.

53. The method of claim 36 further comprising the steps of:

converting each one of the M digital outputs of the IFFTs into one of a plurality of analog, baseband outputs;

modulating each one of the analog baseband outputs into a radio frequency (RF) signal; and transmit each one of the RF signals on one of M antennas.

54. The method according to claim 53 wherein there exists a broadcast mode, during which broadcast mode one of the M antennas is used for transmission.

55. The method according to claim 54, wherein during the broadcast mode only one of the M antennas is used for transmission.

56. The method according to claim 54 wherein the one of the M antennas sends a Request-to-Send (RTS) signal.

57. The method according to claim 56 wherein a new channel estimate is extracted from a Clear to Send (CTS) signal that is received in response to the sent RTS signal.

58. The method according to claim 36 wherein a channel estimate aging threshold is set so that if the channel estimate becomes outdated, the outdated channel estimate is not used.

59. The method according to claim 58 wherein, in response to the setting of the channel estimate aging threshold, an updated channel estimate is obtained from a Clear-to-Send (CTS) signal that is received in response to a sent Request to Send (RTS) signal.

60. The method according to claim 53 wherein at least one of the M antennas transmits a CTS signal, thereby indicating to other transmitters to not transmit for a certain amount of time, thereby avoiding hidden node problems.

61. The method according to claim 36 wherein the M signals are one of 802.11a and 802.11g signals.

62. The method according to claim 36 wherein M equals 2.

63. The method according to claim 36 wherein M equals 4.

64. The method according to claim 36 wherein during a broadcast mode M antennas are use to transmit M RF signals that together correspond to a broadcast signal, and wherein one of the M antennas transmits an RF signal corresponding to a portion of that digital output that represents sub-carriers from 1/M of the frequency bins, and each of the other of the M antennas transmits an RF signal corresponding to another portion of that digital output that represents sub-carriers from the each of the other 1/M of the frequency bins.

65. The method according to claim 36 further including M antennas, and wherein less than all of the M antennas are used to transmit RF signals, and wherein the less than all of the M antennas transmit on communication channels having a predetermined quality measure.

66. The method according to claim 36 wherein the array pattern is shaped to counter channel effects.

67. The method according to claim 36 wherein the distinct array antenna pattern includes a plurality of distinct spatial patterns, one for each frequency bin.

* * * * *